United States Patent
Fischperer

(10) Patent No.: US 7,173,387 B2
(45) Date of Patent: Feb. 6, 2007

(54) ARRANGEMENT HAVING AT LEAST ONE LONG-STATOR LINEAR MOTOR, FOR OPERATING MAGNETICALLY LEVITATED VEHICLES

(75) Inventor: Rolf Fischperer, Berlin (DE)

(73) Assignee: Transrapid International GmbH & Co. KG, Berlin (DE)

( * ) Notice: Subject to any disclaimer, the term of this patent is extended or adjusted under 35 U.S.C. 154(b) by 0 days.

(21) Appl. No.: 11/268,370

(22) Filed: Nov. 7, 2005

(65) Prior Publication Data
US 2006/0096495 A1 May 11, 2006

(30) Foreign Application Priority Data
Nov. 10, 2004 (DE) .................. 10 2004 054 918

(51) Int. Cl.
H02P 1/00 (2006.01)
H02K 41/00 (2006.01)

(52) U.S. Cl. .................. 318/135; 318/38; 104/286; 104/292; 310/12

(58) Field of Classification Search .................. 318/38, 318/135, 110, 111; 310/12; 104/286, 292
See application file for complete search history.

(56) References Cited

U.S. PATENT DOCUMENTS

| | | | |
|---|---|---|---|
| 4,360,748 A | 11/1982 | Raschbichler et al. | |
| 4,361,095 A | 11/1982 | Gibson | |
| 4,636,667 A | 1/1987 | Holzinger et al. | |
| 4,665,329 A | 5/1987 | Raschbichler | |
| 4,728,382 A | 3/1988 | Raschbichler | |
| 5,053,654 A * | 10/1991 | Augsburger et al. | 310/12 |
| 6,411,049 B1 * | 6/2002 | Fischperer | 318/38 |
| 6,753,666 B2 * | 6/2004 | Fischperer | 318/135 |
| 2003/0227269 A1 * | 12/2003 | Fischperer | 318/135 |
| 2006/0096495 A1 * | 5/2006 | Fischperer | 104/281 |
| 2006/0097116 A1 * | 5/2006 | Fischperer | 246/468 |

FOREIGN PATENT DOCUMENTS

| | | |
|---|---|---|
| DE | 2932764 | 3/1981 |
| DE | 3006382 | 8/1981 |
| DE | 3303961 | 8/1983 |
| DE | 3410119 | 10/1985 |
| DE | 19922441 | 11/2000 |
| DE | 10227253 | 10/2003 |

OTHER PUBLICATIONS

Magazine Elektrotechnische Zeitscurift ETZ, vol. 108, No. 9 1987, Jrgen Meins.

* cited by examiner

Primary Examiner—Paul Ip
(74) Attorney, Agent, or Firm—Michael J. Striker

(57) ABSTRACT

The invention relates to an arrangement for operating a magnetically levitated vehicle by means of an arrangement having at least one long-stator linear motor. The linear motors are sub-divided, longitudinally of a track, into individual motor regions (A) in each of which only one vehicle (7) is able to travel at a time. To make possible different frequencies of service for the vehicles (7), i.e. different intervals between the vehicles (7), the region boundaries (B) between at least two motor regions (A1, A2) which follow one another in the direction of travel are arranged to be variable.

11 Claims, 6 Drawing Sheets

ARRANGEMENT HAVING AT LEAST ONE LONG-STATOR LINEAR MOTOR, FOR OPERATING MAGNETICALLY LEVITATED VEHICLES

FIELD OF THE INVENTION

The invention relates to an arrangement for operating magnetically levitated vehicles, comprising: at least one a.c. winding which is laid out longitudinally of a track and is sub-divided into winding sections, an exciter arrangement which is mounted on the vehicle, track-segment cables arranged longitudinally of the track, voltage sources arranged at a distance longitudinally of the track, switching means, control means connected to the latter for connecting the winding sections in succession to assigned track-segment cables and voltage sources in line with the movement of the vehicle, and motor regions which follow one another in the direction of the track which are formed by assigned winding sections, track-segment cables and voltage sources, and which are marked off from one another by region boundaries such that in each of said motor regions only one vehicle can be operated.

BACKGROUND OF THE INVENTION

In known methods and arrangements of this kind, use is made of long-stator linear motors (e.g. U.S. Pat. No. 5,053,654, DE 199 22 441 A1) which include, as a primary member, a long stator which is laid out longitudinally of a given track and which has at least one long-stator winding (e.g. U.S. Pat. No. 4,665,329, U.S. Pat. No. 4,728,382) in which a travelling electromagnetic field, which advances in the direction of movement of the vehicle to be operated, is generated. What acts as a secondary member on the other hand is an exciter arrangement which is mounted on the vehicle and generally extends for the entire length of the latter (e.g. DE 34 10 119 A1) and which is composed of electromagnets which also act as supporting magnets. The long-stator winding is usually sub-divided into a plurality of winding sections which are situated directly behind one another in the direction of travel, which are separated from one another electrically by changeover points and which, although at lengths of 1000 m to 2000 m for example they are comparatively short, are still considerably longer than the vehicle, which may for example be up to 250 m long. Laid out parallel to the track there are also a plurality of comparatively long (e.g. approx. 20 km long) track-segment cables or track-cables which are connected at one end (=single feed) or at both ends (=double feed) to so-called sub-stations in which the voltage sources, in the form of converters, local control means and the like, required for supplying the long-stator winding with current and voltage are installed. To limit energy consumption and the effective impedance, it is only ever those winding sections in which the vehicle is situated at the time which are supplied with current, which is done by connecting the individual winding sections individually and in succession to assigned track-segment cables and voltage sources, with the help of switching means, in line with the movement of the vehicles. Appropriate changeover means may be provided for the connections between the track-segment cables and the voltage sources (DE 29 32 764 A1). When magnetically levitated vehicles of this kind are being operated, the voltage sources supply voltages which are substantially equal to the sum of the voltage induced by the vehicle (inductor voltage), the voltage drop across the relevant winding section and the voltage drop across the associated part of the track-segment cable.

Because of the mode of operation which has been described, the driving means, i.e. the motor for the magnetically levitated vehicle is sub-divided into a plurality of motor regions which follow one another in the direction of the track. Each motor region contains at least one track-segment cable, winding sections assigned to the track-segment cable, and at least one voltage source connected to the track-segment cable for the supply of energy. There can in this case, for practical and technical reasons, only ever be one magnetically levitated vehicle in each motor region, i.e. a succeeding vehicle may not enter a motor region until a preceding vehicle has left the said motor region. This means that the timing of services or the frequencies of service, i.e. the intervals between the vehicles, and the timetable when vehicles are at the maximum permitted frequency are preset at fixed figures by the lengths of the motor regions and can no longer be changed once a railway for magnetic levitation has been built. Arrangements of the kind described have therefore, to date, been operated with frequencies of service which are the same for all the magnetically levitated vehicles. Consequently, a plurality of vehicles travelling on the track are always spaced apart from one another at the same intervals in time.

In the practical application of magnetic levitation railways of this kind a requirement has arisen for vehicles to be allowed to travel on the same track at different frequencies of service. In particular, the intention is that the vehicles should be able to stop at different stops, should follow different speed profiles and should be able to run every ten minutes for example, but also, if need be, every five minutes. As a result of a mode of operation of this kind, it needs to be possible for two vehicles to be spaced apart at longer intervals at certain points along the track, and at other points to move up considerably closer to one another than would be the case if the frequency of service remained the same. However, with the arrangements known hitherto, this is possible, at best, by reducing the length of the motor regions as appropriate at the places where the vehicles move up closer to one than usual, so that two vehicles can still be operated by one assigned motor region each even when the interval between them is the shortest possible one. This is not in any way acceptable in view of the considerable increase in the cost of installation that it involves and the fact that the need for non-uniform frequencies of service generally only exists for a certain time, i.e. at given times of day or when there are unforeseen operating conditions.

SUMMARY OF THE INVENTION

It is, therefore, an object of this invention to design the arrangement specified above in such a way that different intervals between vehicles traveling on the track can be obtained.

A further object of the invention is to improve the arrangement such that different frequencies of service for the vehicles can be obtained without any major changes to the hardware.

Yet another object of the invention is to make it possible to bring the vehicles closer together than has been usual hitherto by up to half of the intervals between them.

Still another object is to design the arrangement specified above such that also linear motors which have already been installed can be converted retrospectively.

These and other objects are solved by an arrangement which is characterized in accordance with the present invention in that, to make different frequencies of service possible for the vehicles or in other words to make different intervals possible between the vehicles, at least one motor region is provided with at least one region boundary which is arranged to be variable.

In the same way as hitherto, the invention takes it as a basis that, at any point, precisely one motor region will always be assigned to each vehicle travelling on a track. However, in contrast to previous solutions, the boundaries of these motor regions are not permanently assigned to given sections of the track but are variable as a function of the frequencies of service, thus enabling longer motor regions to be made available for faster vehicles and shorter ones for shorter vehicles for example, and hence also enabling the intervals between vehicles travelling at different speeds to be adjusted to suit requirements. In other words, the motor regions along the track can be sub-divided in a different way without changing the number of motor regions. The structural changes required for this purpose call for only comparatively modest expenditure and can be made without any loss in power for the motor. Also, the invention has the advantage that it can be applied both to single-feed linear motors and to double-feed linear motors.

Further advantageous features of the invention can be seen from the sub-claims.

BRIEF DESCRIPTION OF THE DRAWINGS

The invention will be explained in detail below in connection with the accompanying drawings by reference to embodiments. In the drawings

DETAILED DESCRIPTION OF PREFERRED EMBODIMENTS OF THE INVENTION

Figure 1:
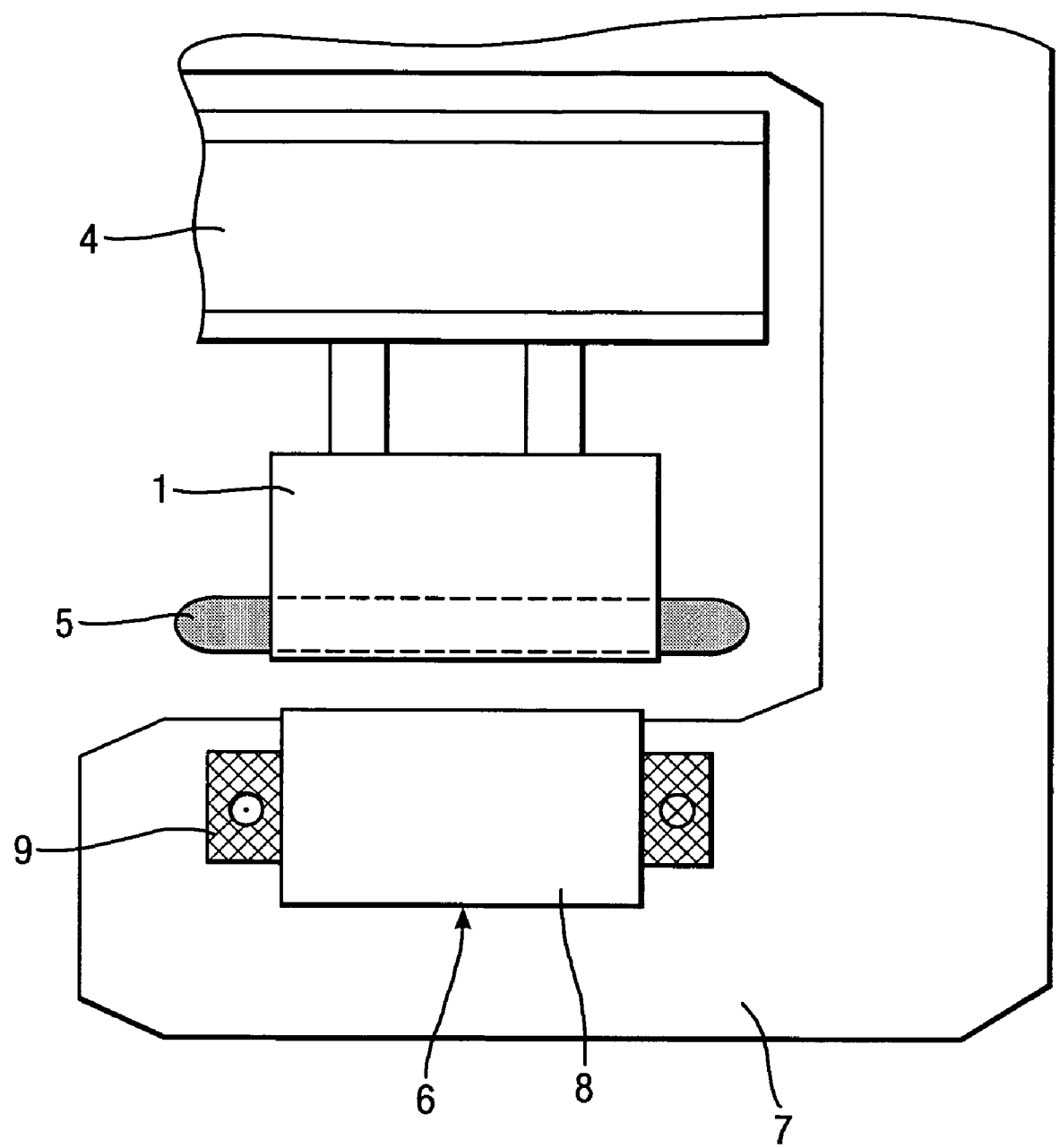
FIG. 1 is a diagrammatic cross-section through a magnetically levitated vehicle and its track, in the region of the long-stator motor.

On a magnetically levitated railway having a synchronous long-stator linear motor (FIGS. 1 and 2), a laminated stator core 1, which has a plurality of slots and teeth arranged in succession to one another, is connected in a fixed position to a track 4 which is set up along a preset route. Inserted in the slots in the laminated stator core 1 is a long-stator winding 5 in the form of a three-phase winding which is fed with three-phase current of variable amplitude and frequency by a converter, as a result of which an advancing or travelling (transient) wave is set up in a known fashion longitudinally of the long-stator linear motor. The exciter field of the long-stator linear motor is generated by an exciter arrangement 6 which is formed by a plurality of magnets which are mounted on a vehicle 7, which are arranged in a distributed fashion in the latter's longitudinal direction, which at the same time perform a supporting function and which each comprise a magnet core 8 and an exciter winding 9. Further, generally a laminated stator core 1 having a long-stator winding 5, normally three-phase, and having an assigned exciter arrangement 6 are provided on both sides of the track 4, with three individual windings belonging to the three phases of the three-phase current being arranged in sequence one behind the other or being interwound with one another and being for example star-connected.

Figure 2:
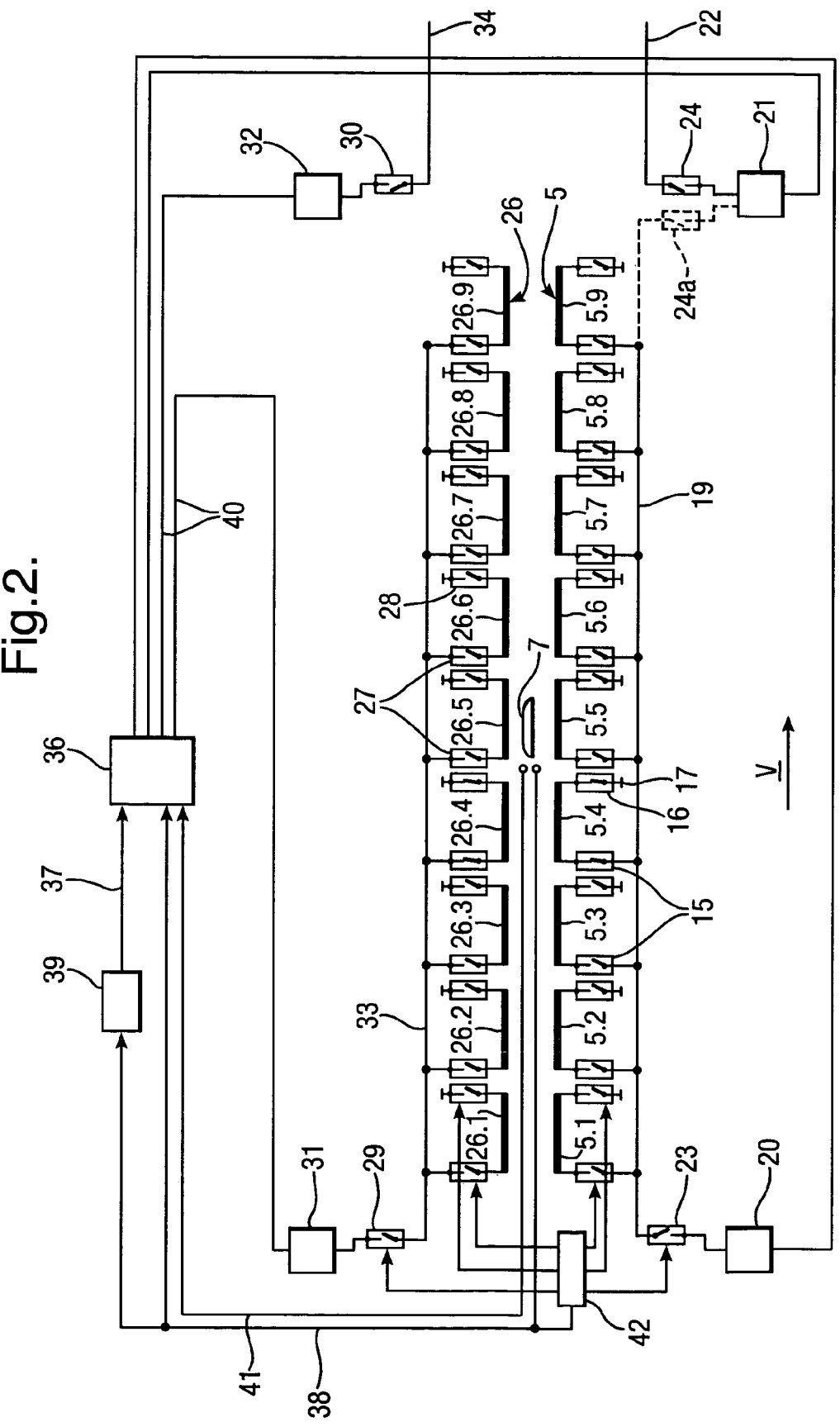
FIG. 2 is a diagrammatic view of a known arrangement, having a single-feed long-stator linear motor, for operating a magnetically levitated vehicle as shown in FIG. 1.

To minimise the long-stator motor's demand for reactive power and for voltage, it is only that part of the long-stator winding 5 that the vehicle 7 is travelling along at that moment, e.g. in the direction of the track (arrow v), that is activated at any given time (FIG. 2). For this purpose, the long-stator winding 5, as shown diagrammatically in FIG. 2, is sub-divided into a plurality of winding sections 5.1 to 5.9 which follow one another in direct succession in the longitudinal direction of the track and each of which can be connected, via associated switching means 15 and 16, to a neutral or star point 17 and to a track-segment cable 19. At the time shown in FIG. 2, this is true of winding section 5.4. In the embodiment, one end of the track-segment cable 19 is connected to a voltage source 20. The voltage source 20 generally comprises at least one converter and is housed in a sub-station which contains at least the means required to feed the current into the winding sections 5.1 to 5.9 and also, where required, all the means which are required to control and monitor the vehicle in that region of the long-stator winding 5 which is being fed by the track-segment cable 19. Further voltage sources 21 are connected to further track-segment cables 22 which follow on along the track and by which subsequent winding sections of the linear motor can be fed in a corresponding manner. With the help of switching means 23, 24, the various voltage sources 20, 21 are activated whenever the vehicle 7 enters or leaves the section of the track which is defined by a voltage source 20, 21 or by a track-segment cable 19, 22.

Since, as shown in FIG. 2, the track-segment cables 19, 22 are each connected to only one voltage source 20 and 21 respectively, this mode of operation is known as "single feed". Alternatively however, modes of operation are also known in which there is a "double feed", where the two ends of each track-segment cable 19 can be connected to respective voltage sources 20 and 21, as is indicated in FIG. 2 by an additional switching means 24a shown in broken lines. This variant, which is often preferred for reasons of redundancy, on the one hand allows the installed power of the voltage sources to be reduced and on the other hand means that, if one voltage source fails, the vehicle 7 will still be operated by the current supplied by the other voltage source.

Also, the winding sections 5.1 to 5.9 shown in FIG. 2 are generally used to drive only one side, e.g. the right-hand side, of the vehicle 7. Further winding sections 26.1 to 26.9 of a winding 26, switching means 27, 28 and 29, 30, voltage sources 31 and 32 and track-segment cables 33, 34 are used in a corresponding way to drive the left-hand side of the vehicle.

To control the magnetically levitated railway which has been described, use is made of a speed/current controller 36 to which are fed, via a line 37, desired values for the speed which the vehicle 7 is to reach or to maintain and, via a line 38 or even by radio, the signal for its current position which is transmitted by the vehicle 7. The desired values for speed are placed in store in for example a desired-value memory 39, to which the position signal is also fed and which emits a desired value of current or speed which is preset for the winding section being travelled along at the time.

The current controller 36 supplies at outputs 40 desired values which comprise for example desired values of voltage and which are fed to the voltage sources 20, 21, 31 and 32 in order to generate in the latter the voltages which are to be applied to the track-segment cables or in other words to feed into the winding sections the currents required to obtain the nominal speed. By means of the actual-value signal for speed determined on the vehicle 7, which appears on a line 41, the speed controller 36 checks that the prescribed nominal speed is being observed.

Finally, there are indicated in a simplified form in FIG. 2 control means 42 connected to the line 38, and it is by means of these control means 42 that the various switching means 15, 16, 23, 24, (24a), 29 and 30 belonging to the track section seen in FIG. 2 are controlled, as a function of the actual position of the vehicle 7 in direction v, in such a way that it is always only the winding sections which are being travelled though at the time and the associated voltage sources which are connected to the different track-segment cables. Like the voltage sources 20, 21 or the like, the control means 42 may be housed in the sub-stations.

Methods and arrangements of the kind described, and their operation, are known from printed publications DE OS 29 32 764 A2, DE 30 06 382 C2, DE 33 03 961 A1, U.S. Pat. Nos. 4,665,329, 4,728,382 and 5,053,654 which, to avoid repetition, are therefore incorporated by reference in the present disclosure.

In the arrangement shown in FIG. 2, the track-segment cable 19, the voltage source 20 connected thereto, and the winding sections 5.1 to 5.9 which can be connected to the track-segment cable 19, form a unit which is referred to in what follows as a drive region or a "motor region". Because the vehicle 7 shown in FIG. 2 is driven at both longitudinal sides, the track-segment cable 33, the voltage source 31 and the winding sections 26.1 to 26.9 also belong to this motor region.

Because a magnetically levitated vehicle operates in the way which has been described, only one magnetically levitated vehicle at a time can travel in a motor region. As a result, the frequency of service depends on the length (e.g. 20 km) of the part of the track served by the track-segment cables 19 and 33 and on the speed of the vehicles. The present invention on the other hand makes it possible to have the vehicles travel on the track at different frequencies of service. This will be explained in detail below by reference to four embodiments.

Figure 3A:
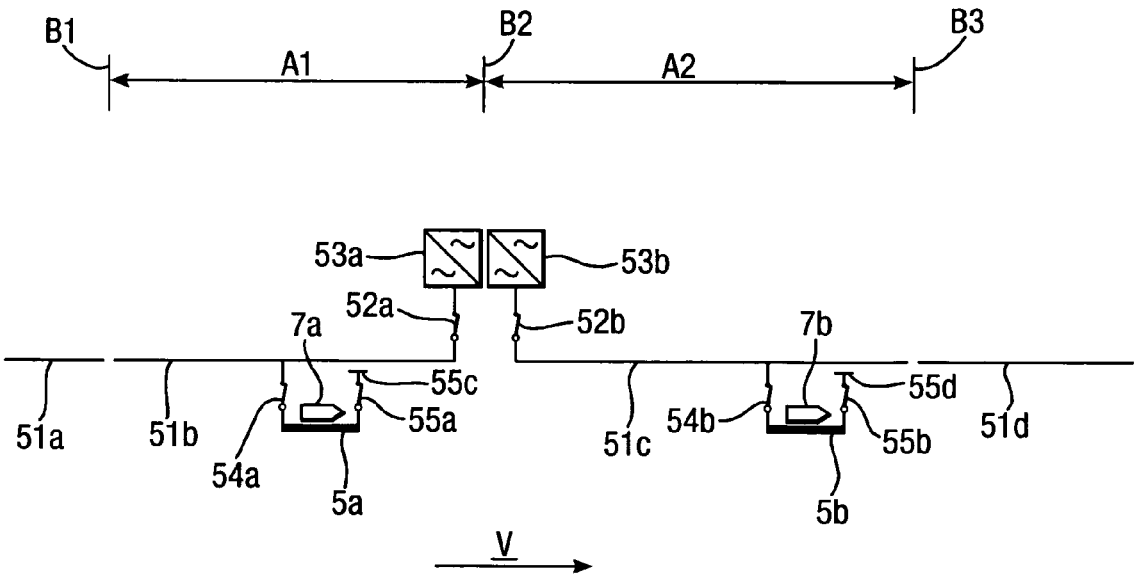
FIGS. 3a and 3b are diagrammatic representations of a first embodiment of the construction of a motor region, in accordance with the prior art and in accordance with the invention respectively, when the single feed shown in FIG. 2 is employed.

FIG. 3a shows, in diagrammatic form, a known mode of operation where the feed is single and the voltage sources and track-segment cables are permanently assigned, it being assumed that vehicles 7a and 7b are moving in the direction of the arrow v. For this purpose, there are shown in the embodiment, along the track, four track-segment cables 51a to 51d arranged one behind the other. Each track-segment cable (e.g. 51b, 51c) can be connected to a voltage source 53a, 53b which is permanently assigned to it, by means of a respective switching means (e.g. 52a, 52b). In contrast to FIG. 2, the voltage sources 53a, 53b on the one hand cannot be changed over to adjacent track-segment cables (e.g. 19 and 22 in FIG. 2) and on the other hand are not always arranged at ends which are leading in the direction of the arrow v but, for example, alternately at the leading and trailing ends of the track-segment cables, which means for example that the voltage source 53b feeds the track-segment cable 51c and the voltage source 53a feeds the track-segment cable 51b. The rest of the track-segment cables can be connected to voltage sources and winding sections in a corresponding way. The present switching means and all the others described below are controlled by means of the control means 42 which are shown diagrammatically in FIG. 2. To simplify the drawings, the latter are not however shown separately in FIGS. 3 to 6.

In a similar way to that shown in FIG. 2, the track-segment cables 51b, 51c can be connected to the winding sections 5.1 to 5.9 assigned to them by means of switching means 54a, 54b. For the sake of simplicity in FIG. 3a for each track-segment cable 51b, 51c only a single assigned winding section 5a and 5b respectively is shown which, in a continued similarity to FIG. 2, can be connected to respective neutral or star points 55c and 55d via switching means 55a and 55b. The rest of the track-segment cables and winding sections can be connected to voltage sources (not shown) in a corresponding way.

In a mode of operation where the frequency of service or in other words the frequency of the trains or vehicles is constant, the track-segment cable 51b, together with the associated voltage source 53a and the winding section 5a, forms a motor region A1, whereas the track-segment cable 51c, together with the voltage source 53b and the winding section 5b, forms a motor region A2. No more than a single vehicle 7a or 7b at a time is situated in each of these motor regions A1, A2 which are arranged one behind the other in the direction of the arrow v. For this reason, the switching means 52a and 52b, 54a and 54b and 55a and 55b are each in the closed state when the vehicles 7a, 7b are travelling through. For the sake of simplicity, it is assumed in this case that, because there is a given frequency of service, all the vehicles 7a, 7b are operated at the same speed and are therefore at substantially the same distance from one another at all points and, when there is a changeover from for example motor region A1 to motor region A2 there is no need for a change of programming for the control means 42 (FIG. 2). The rest of the track-segment cables, voltage sources and winding sections which are present along the track form motor regions which are operated in a corresponding way.

Figure 3B:
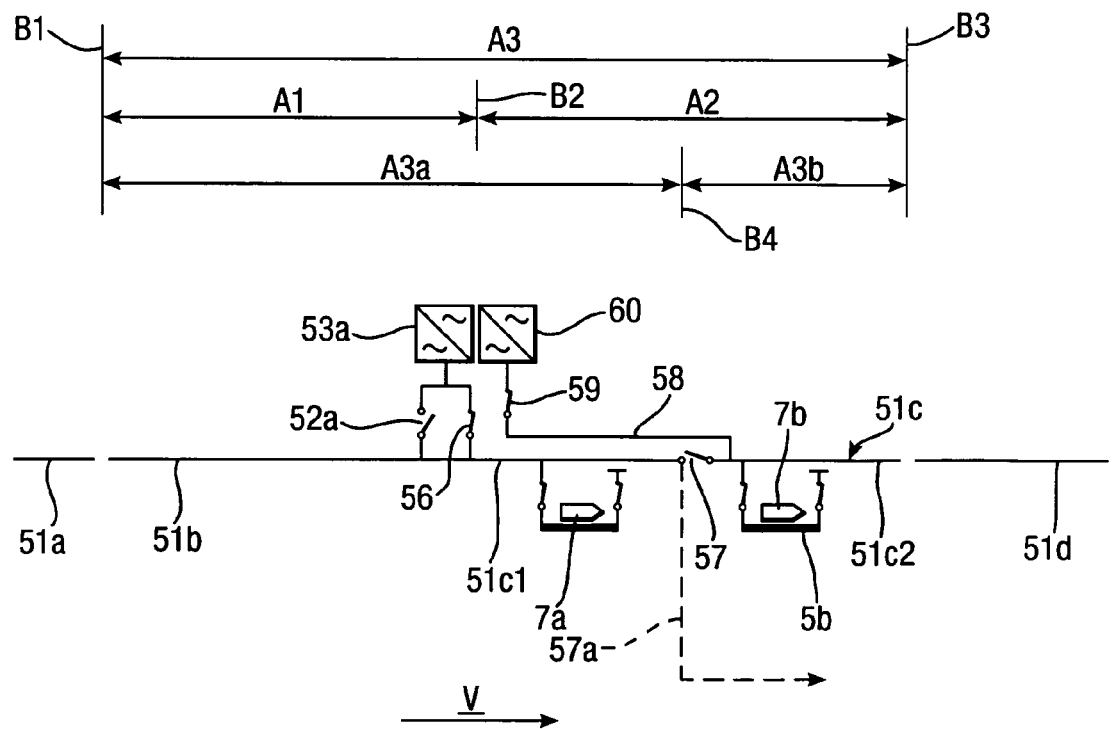

As shown in FIG. 3, the changeover of the vehicles 7a, 7b from a leading motor region to a trailing motor region takes place at imaginary region boundaries B1, B2, B3 etc., which in the present case are defined by the ends of the associated track-segment cables 51b, 51c, etc. To enable the vehicles 7a, 7b which are situated on the section of track which is shown between the region boundaries B1 and B3 in the drawing to travel at intervals other than those shown in FIG. 3a, the invention makes provision for at least one region boundary to be arranged to be variable and for the motor regions to be varied accordingly when there is a change in the frequencies of service. The procedure adopted for this purpose is as follows, as shown in FIG. 3b.

The relevant end of the track-segment cable 51c is first connected, by means of a further switching means 56, to the voltage source 53a rather than to the voltage source 53b, the switching means 52b (FIG. 3a) being left unused for the time being. Also, the track-segment cable 51c is divided, by means of a disconnecting switch 57 which is fitted into it, into a first track-segment cable section 51c1 assigned to the voltage source 53a and a second track-segment cable section 51c2 which leads to the region boundary B3, the disconnecting switch 57 being connected via a line 57a to the control means 42 (FIG. 2). Finally, the second track-segment cable section 51c2 is connected via a further track-segment cable section 58 and a switching means 59, as which the switching means 52b shown in FIG. 3a can be used, to a further voltage source 60 which is separate from the voltage source 53a and which may be the same as the voltage source 53b in FIG. 3a. This gives the following possibilities.

When the disconnecting switch 57 is in the closed state, the two track-segment cables 51b and 51c, together with the voltage source 53a, define a motor region A3 in which only one vehicle can travel, because the voltage source 53a supplies current either to the track-segment cable 51b, via the switching means 52a, or to the track-segment cable 51c, via the switching means 56, or to both the track-segment cables 51b, 51c simultaneously, via the switching means 52a, 56. In the motor region A3, the two motor regions A1, A2, having the region boundaries B1 and B3 shown in FIG. 3a are combined. In this way, the vehicle 7a cannot normally enter the motor region A3 until the vehicle 7b has already left it. It would also be conceivable for a double feed to be applied in the motor region A3 by means of the voltage sources 53a, 60, i.e. for the voltage source 60 to be connected in addition to the track-segment cable 51b and/or 51c.

Alternatively, it is possible for the motor regions A1 and A2 to be kept in the form shown in FIG. 3a. For this purpose, on the one hand the disconnecting switch 57 and the switching means 59 are closed. On the other hand the switching means 56 is opened. The track-segment cable 51c is now fed by the voltage source 60. Regardless of this, the track-segment cable 51b can be fed at the same time by the voltage source 53a, which is done by changing the switching means 52a to its closed state.

Finally, it is possible in accordance with the invention, if required and by means of the control means 42, on the one hand to open the disconnecting switch 57 and on the other hand to move the switching means 56 and 59 to the closed state. When this is the case, the track-segment cable section 51c1 is fed by the voltage source 53a and the track-segment cable section 51c2 by the voltage source 60. This produces, as shown in FIG. 3b, two mutually independent motor regions A3a and A3b which are separated by a region boundary B4, in which case the motor region A3a may drive the vehicle 7a and the motor region A3b may drive the vehicle 7b. In follows from this that, in contrast to FIG. 3a, both vehicles 7a, 7b can travel along the same track-segment cable 51c independently of one another and can thereby be brought closer together. The fact that this also produces a motor region A3a, which is longer than the corresponding motor region A1 in FIG. 3a, can be accepted in most cases because a (faster) vehicle 7a, which moves closer to a (slower) vehicle 7b than is the case in FIG. 3a, is generally followed by a (slower) vehicle (not shown in FIG. 3b) which, in the track section shown in FIG. 3b, is at a greater distance from the vehicle 7a than that at which the latter is seen in FIG. 3a to be spaced from the vehicle 7b.

In other words, the invention makes provision for the track section shown in FIGS. 3a and 3b to be sub-divided, as required, into motor regions of the same or different lengths. In particular, a motor region extending from a region boundary B1 can be taken to a region boundary B2, B4 or B3, as desired, i.e. a motor region A3 or A3b extending from the region boundary B3 can, by the same token, be shortened or entirely eliminated. By changing the position of the disconnecting switch 57, the region boundary B4 can also be shifted as desired within the given boundaries. Nevertheless, the principle which has been followed to date, namely that precisely one vehicle can be moved in each motor region, is still observed in all cases. However, in accordance with the invention, the motor regions are no longer permanently assigned to a given segment section of the track but are variable as a function of the desired frequency of service.

The voltage sources 53a, 60 shown in FIG. 3b are preferably housed in a common sub-station, in which case the third track-segment cable section 58, which connects the second track-segment cable section 51c2 which lies further away from the voltage source 53a to the voltage source 60, is laid along the track parallel to the first track-segment cable section 51c.

Figure 4A:
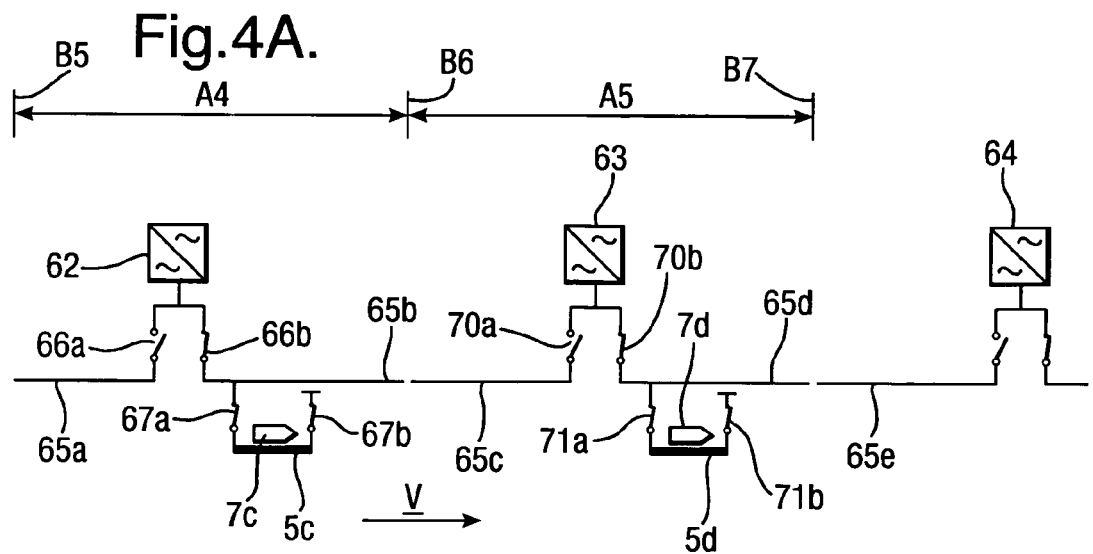
FIGS. 4a, 4b and 4c are representations corresponding to FIGS. 3a and 3b of two further embodiments of single-feed motor regions.
Figure 4B:
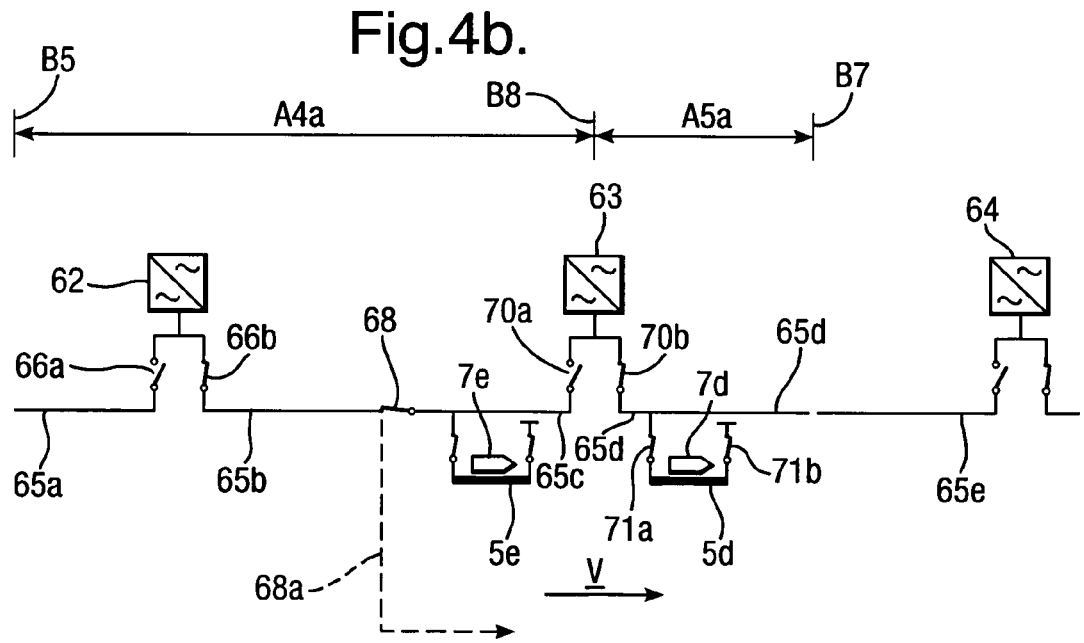

FIGS. 4a and 4b show an embodiment which is operated with a single feed in a similar way to that shown in FIGS. 3a and 3b. Voltage sources 62, 63 and 64 are provided in this case and these are arranged between respective pairs of track-segment cables 65a and 65b, 65c and 65d, and so on and, in a similar way to that shown in FIGS. 2 and 3b can be changed over as desired to one of these track-segment cables 65a, 65b or 65c, 65d etc. The track-segment cables 65b, 65c etc, are also disconnected at their mutually adjoining ends remote from the voltage sources 62, 63. By means of switching means 66a, 66b, the voltage source 62 can first be connected to the track-segment cable 65a and disconnected from the track-segment cable 65b. When a vehicle 7c has passed through the winding sections connected to the latter, the voltage source 62 is connected to the track-segment cable 65b and at the same time is disconnected from the track-segment cable 65a. It is shown in FIG. 4a in this case that the vehicle 7c is being driven at this time by a winding section 5c which is activated by the switching means 67a, 67b, which are in the closed position.

Because the voltage sources 62 to 64 are each able to supply two different track-segment cables with current, a motor region A4 is formed in the case of FIG. 4a by a voltage source (e.g. 62) in each case, by two track-segment cables (e.g. 65a, 65b) assigned to the latter and by the winding sections (e.g. 5c) which are assigned to the track-segment cables. The same is true, mutatis mutandis, of a motor region A5, having winding sections 5d, which follows the motor region A4 in the direction of travel v. Also, the motor regions A4, A5 are bounded by region boundaries B5, B6 and B7. As in the embodiment shown in FIG. 3a, it has to date been taken as a postulate for normal operation that the vehicle 7c may not cross into the motor region A5 until a vehicle 7d travelling ahead of it has left the motor region A5. It follows from this that, in the situation shown in FIG. 4a, the track-segment cable 65c for example is not available to drive the vehicle 7c for as long as the voltage source 63 is connected to the track-segment cable 65d and is driving the vehicle 7d.

In accordance with the invention, provision is made for at least two mutually adjoining track-segment cables (e.g. 65b, 65c), of two motor regions which follow one another (e.g. A4, A5) to be connected by a disconnecting switch 68 (FIG. 4b) which is connected by means of a line 68a to the control means 42 (FIG. 2). As a result, the following two modes of operation are possible.

When the disconnecting switch 68 is in the open state, then the arrangement is as shown in FIG. 4a, i.e. the voltage source 62 for example can drive the vehicle 7c via the track-segment cable 65b and at the same time the voltage source 63 can drive the vehicle 7d via the track-segment cable 65d. When on the other hand the disconnecting switch 68 is closed, as shown in FIG. 4b, then, when the switching means 66b is closed, the voltage source 62 is also able to supply current, via the track-segment cables 65b, 65c which are connected together, to winding sections 5e which actually belong to the motor section A5 (FIG. 4a). The only pre-conditions are that a switching means 70*a* situated between the track-segment cable 65*c* and the voltage source 63 is in an open state and that the vehicle 7*d* is no longer in the region controlled by the track-segment cable 65*c*. However, at the same time as this, the voltage source 63 may be connected to the track-segment cable 65*d* via a switching means 70*b* and, via further switching means 71*a*, 71*b*, current may be supplied, as in FIG. 4*a*, to those winding sections 5*d* which are assigned to the track-segment cable 65*d*.

The motor region A4 (FIG. 4*a*) can therefore be converted by the disconnecting switch 68 into a lengthened motor region A4*a*, while at the same time the motor region A5 (FIG. 4*a*) is converted into a shortened motor region A5*a*. The region boundary B6 has therefore been shifted to a region boundary B8 (FIG. 4*b*). It follows from this that, in a similar way to that shown in FIG. 3*b*, a vehicle 7*e* can be operated in the track section fed by the track-segment cable 65*c* and at the same time the vehicle 7*d* can be operated in a track section which is controlled by the track-segment cable 65*d* situated in direct succession. The interval between the vehicles 7*e*, 7*d* can thereby be reduced by more than half as compared with 4*a*.

The motor regions which are not shown in FIGS. 4*a*, 4*b* may be operated with or without disconnecting switches corresponding to the disconnecting switch 68, as required. As in the case of FIG. 3*b*, the motor regions can be adjusted in this way to the specific frequencies of service.

Figure 4C:
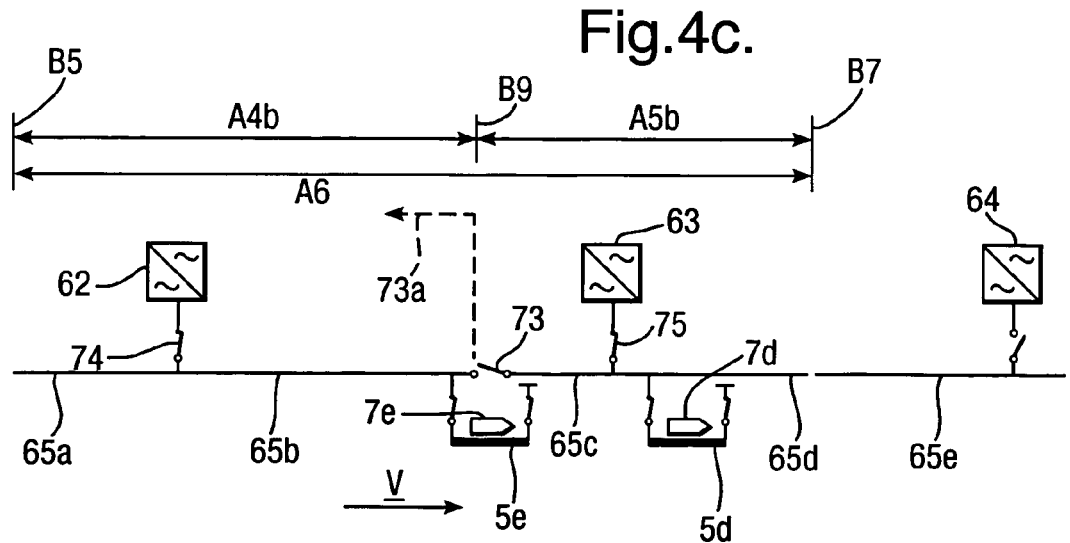

FIG. 4*c* shows an embodiment which is largely identical to the embodiment shown in FIG. 4*b*, for which reason parts which are the same are given the same reference numerals. The differences from FIG. 4*b* in the present case are on the one hand that the track-segment cables 65*b*, 65*c* connected by a disconnecting switch 73 are of different lengths and on the other hand that the switching means 66*a*, 66*b* and 70*a*, 70*b* are replaced by respective single switching means 74 and 75. When the disconnecting switch 73 is open, this gives two motor regions A4*b* and A5*b* having regions boundaries B5, B9 and B9, B7 respectively, in which case one vehicle 5*e*, 5*d* can travel in each motor region A4*b* and A5*b*, as in FIG. 4*b*, provided the switching means 74, 75 are closed. When on the other hand the disconnecting switch 73 is in the closed state, then the entire track section which is situated between the region boundaries B5, B7 forms a motor region which is suitable for particularly large intervals between vehicles, which means that in this case only one of the switching means 74, 75 needs to be in the closed state, assuming that double feed is not wanted. A difference from FIG. 4*b* arises in the present case from the fact that, when the disconnecting switch 73 is open, the vehicle 7*d* is also operated in a part of the motor region A5*b* which is controlled by the track-segment cable 65*c* and is thus situated upstream of the voltage source 63, and the vehicle 7*e* can be brought up even closer to the vehicle 7*d* than in FIG. 4*b*.

Figure 5A:
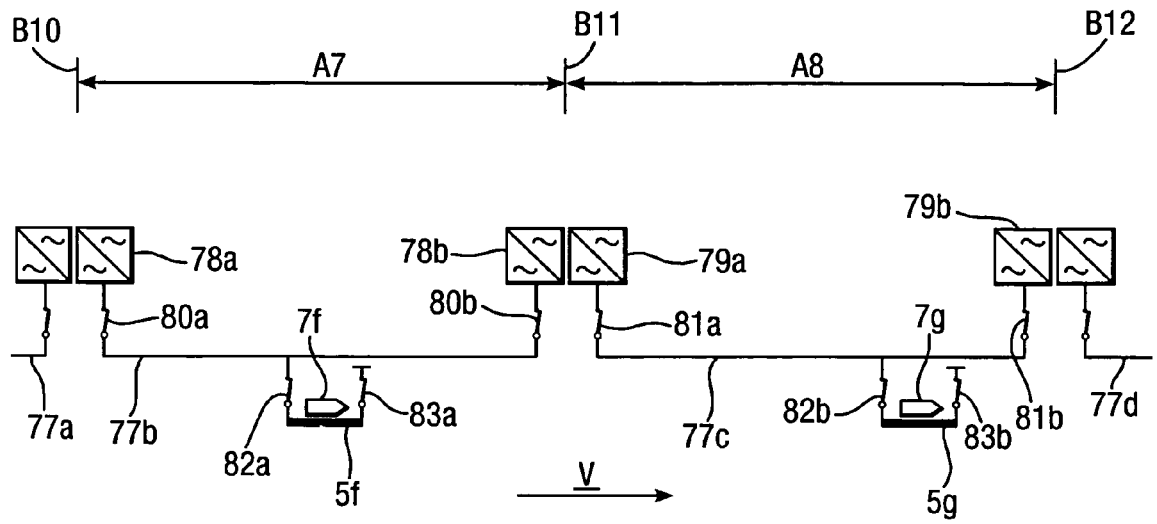
FIGS. 5a, 5b and 6a, 6b, 6c are representations corresponding to FIGS. 3a to 4c respectively of three further embodiments of the invention which have double feeds.
Figure 5B:
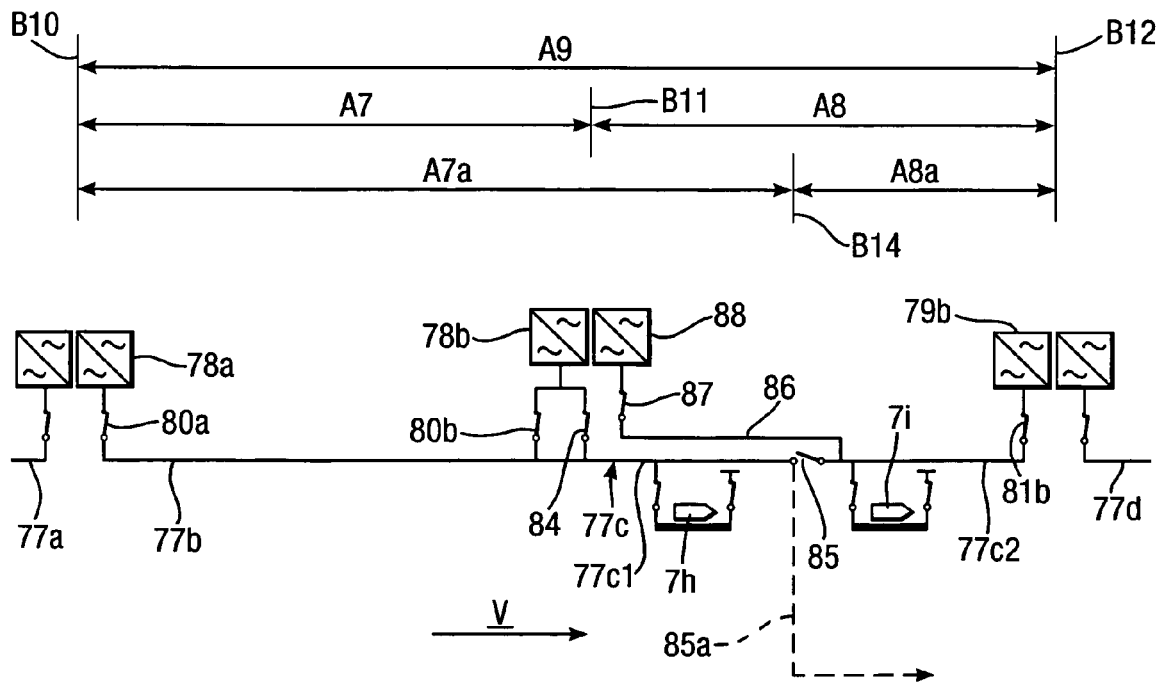

FIGS. 5*a* and 5*b* show an embodiment which is similar to that shown in FIG. 3*b* but which operates with a double feed. In FIG. 5*a*, in line with the mode of operation employed hitherto, four track-segment cables 77*a* to 77*d* for example are present one behind the other. The track-segment cables 77*b*, 77*c* are each connected at their ends to pairs of permanently assigned voltage sources 78*a*, 78*b* and 79*a*, 79*b* respectively. With pairs of connected voltage sources (e.g. 78*a*, 78*b* and 79*a*, 79*b*) and associated winding sections (5*f*, 5*g*), the track-segment cables (e.g. 77*b*, 77*c*) also form respective motor regions A7 and A8 in which only single vehicles 7*f* and 7*g* can travel at a time provided on the one hand that the track-segment cables 77*b*, 77*c* are connected to their assigned voltage sources 78*a*, 78*b* and 79*a*, 79*b* respectively via switching means 80*a*, 80*b* and 81*a*, 81*b* respectively and on the other hand that the associated winding sections 5*f*, 5*g*, etc. are activated via switching means 82*a*, 83*a* and 82*b*, 83*b* respectively. In this case the region boundaries B10 to B12 correspond to the positions of sub-stations or the like in which the voltages sources 78*a*, 78*b* and 79*a*, and 79*b* are housed in pairs or in other words at which the track-segment cables 77*b*, 77*c* terminate.

The arrangement shown in FIG. 5*b* is used to make a change, in accordance with the invention, in the intervals between vehicles which are set by the motor regions A7 and A8. In this case, in a similar way to what is done in FIG. 3*b*, one end of the track-segment cable 77*c* is first connected to the voltage source 78*b* rather than to the voltage source 79*a*, by means of a further switching means 84. Also, the track-segment cable 77*c* is divided, by means of a disconnecting switch 85 which is fitted into it, into a first track-segment cable section 77*c*1 assigned to the voltage source 78*b* and a second track-segment cable section 77*c*2 assigned to the voltage source 79*b*, the disconnecting switch 85 being connected via a line 85*a* to the control means 42 (FIG. 2). Finally, the second track-segment cable section 77*c*2 is connected via a third track-segment cable section 86 and a switching means 87 to a further voltage source 88 which is separate from the voltage source 78*b*, for which purpose use could be made of the switching means 81*a* and the voltage source 79*a* shown in FIG. 5*a*. This gives the following possibilities.

When the disconnecting switch 85 is in the closed state and the switching means 87 is in the open state, then the two track-segment cables 77*b* and 77*c*, together with the voltage sources 78*a*, 78*b* and/or 79*b*, define a motor region A9 having the region boundaries B10 and B12 shown in FIG. 5*a*. Because the voltage source 78*b* is connected in this case via the switching means 80*b* to the track-segment cable 77*b* and via the switching means 84 to the track-segment cable 77*c*, only a single vehicle would be able to travel in the motor region A9 unless the double-feed were sacrificed.

Alternatively, it is possible for the motor regions A7 and A8 to be kept in the form shown in FIG. 5*a*. For this purpose, on the one hand the disconnecting switch 85 is closed and on the other hand the switching means 84 is opened. The track-segment cable 77*c* can then be fed by both the voltage sources 88 and 79*b* and, regardless of this, the track-segment cable 77*b* can be fed at the same time by the voltage sources 78*a* and 78*b* if the switching means 80*a*, 80*b* are closed.

If, finally, the disconnecting switch 85 is, in accordance with the invention, moved to the open state and the switching means 87 to the closed state, then two mutually independent motor regions A7*a* and A8*a* can be created. The motor region A7*a* contains the track-segment cable 77*b* and the track-segment cable section 77*c*1. It is produced by closing the switching means 80*a*, 80*b* and 84 and extends to a region boundary B14 which is defined by the disconnecting switch 85. The desired double feed is provided by the voltage sources 78*a* and 78*b*. The motor region A8*a* on the other hand contains only the track-segment cable section 77*c*2, which however is likewise fed by two voltage sources, 88 and 79*b*, if switching means 87 and 81*b* are closed. It is therefore possible, by means of the disconnecting switch 85, for three different region boundaries B11, B14 and 12 to be provided, in the track section shown in FIGS. 5*a*, 5*b*, for a motor region extending from the region boundary B10. Also, two vehicles 7*h*, 7*i* can, theoretically, be moved as close together as is given by the position of the disconnecting switch 85. However, in this case too, the vehicle 7*h* can only enter the motor region A8*a* after the vehicle 7*i* has left it.

Figure 6A:
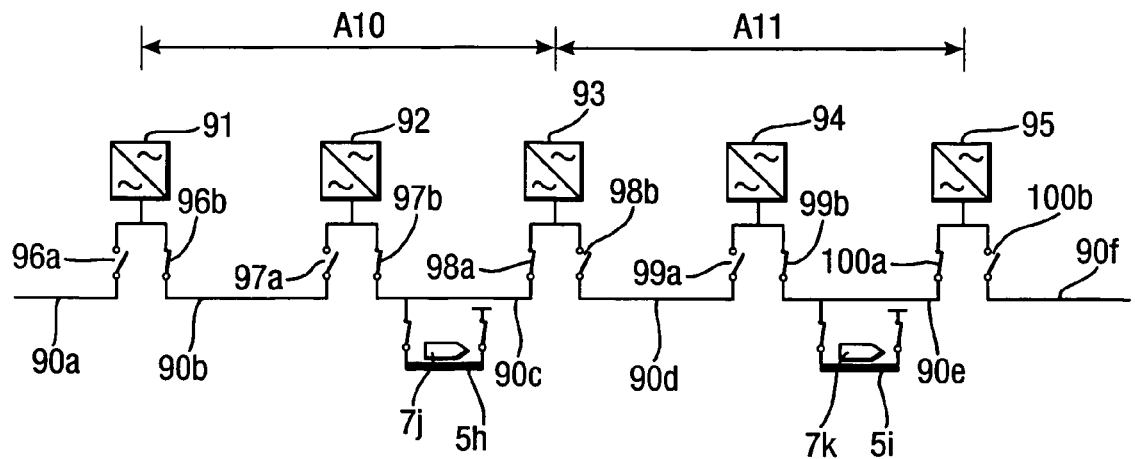
Figure 6B:
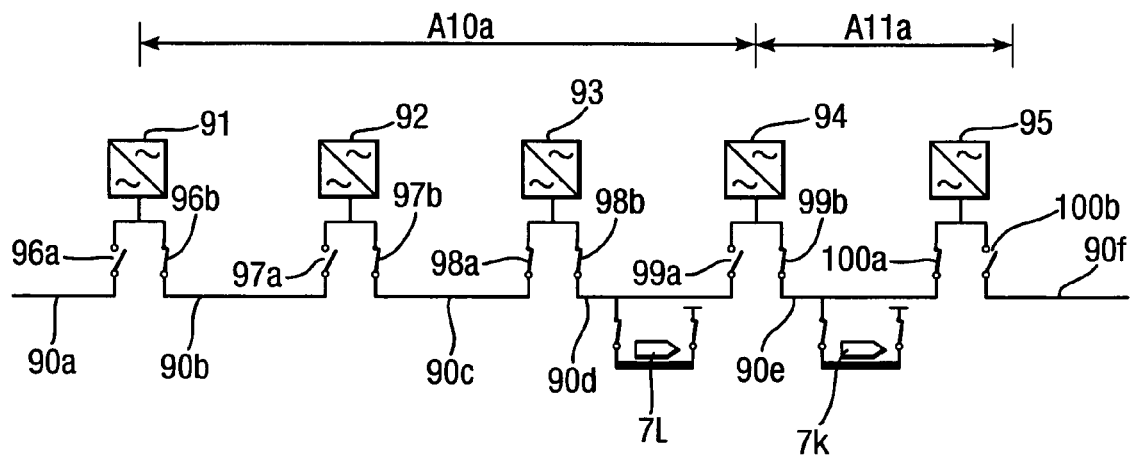
Figure 6C:
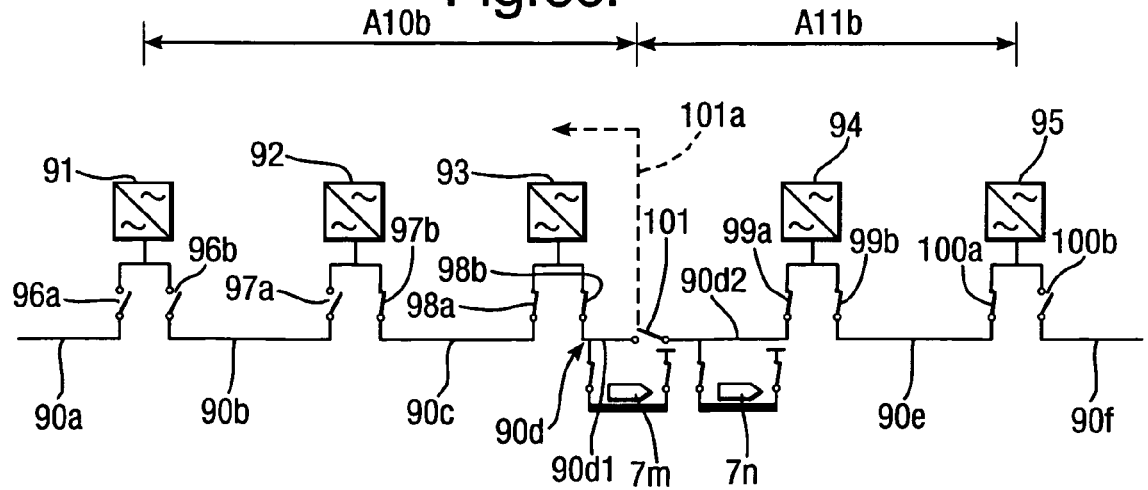

Finally, FIGS. 6*a* to 6*c* show two further embodiments which, in a similar way to what is done in FIGS. 5*a* and 5*b*, provide a double feed. In this case, the same parts are once again given the same reference numerals.

Shown in FIG. 6*a* are for example six track-segment cables 90*a* to 90*f* arranged one behind the other in the direction of the track, and five voltage sources 91 to 95 which can be connected to the track-segment cables 90*a* to 90*f* by switching means 96*a*, 96*b* and so on to 100*a*, 100*b*. If for example the switching means 97*b*, 98*a* and 99*b*, 100*a* are in the closed state, as shown in FIG. 6*a*, whereas all the other switching means are in the open state, then the track-segment cables 90*c* and 90*e* are supplied with current and vehicles 7*j* and 7*k* can thus be operated in the way described above with a double feed. It should be noted in this case that the track-segment cables 90*b* and 90*d* for example are unable to supply further vehicles with current at this time because their assigned voltage sources 91 to 94 are not available to them.

In the embodiments which have already been described, on the one hand the voltage sources 91, 92 and 93, the track-segment cables 90*b* and 90*c* assigned thereto and the associated winding sections 5*h* form, in the state shown, a first motor region A10, whereas, on the other hand, the voltage sources 93, 94 and 95, the track-segment cables 90*d* and 90*e* assigned thereto and the winding sections 5*i* which can be connected to the latter, form a second motor region A11. If the vehicles 7*j* and 7*k* subsequently make their way into the region of the winding sections (not shown) which are respectively connected to the track-segment cables 90*d* and 90*f*, the switching means 97*b*, 98*a*, 99*b*, 100*a* are opened and the switching means 98*b*, 99*a* and 100*b* are closed in their place, and the track-segment cables 90*d* and 90*f* can then be supplied with current. As in the embodiments described previously however, the vehicle 7*j* cannot enter the motor region A11 until the vehicle 7*k* has left the said motor region A11 and the voltage source 94 is thus available for the vehicle 7*j*.

FIG. 6*b* by contrast shows the control according to the invention of the switching means, by reference to an embodiment which is currently considered best. As shown in this case, the switching means 97*b*, 98*a* and 98*b* for example on the one hand, and the switching means 99*b*, 100*a* on the other hand are in the closed state, whereas the other switching means are in the open state. The result of this is that the track-segment cables 90*c* and 90*d* which follow one another are fed by the voltage sources 92 and 93 and current is fed to the track-segment cable 90*e* by the voltage sources 94 and 95. There therefore appears in FIG. 6*b* a motor region A10*a* which is enlarged in comparison with the motor region 10 in FIG. 6*a* by the length of the track-segment cable 90*d*, while a motor region A11*a* in FIG. 6*b* is at the same time shortened by the same length in comparison with motor region A11 in FIG. 6*a*. In this way, a vehicle 71 is able to move closer in FIG. 6*b* than in FIG. 6*a* to the vehicle 7*k* which is situated at the same point as in FIG. 6*a*. As in the other embodiments, this is made possible, in other words, by the fact that a region boundary B15 of the motor region A10 (FIG. 6*a*) has been shifted to a region boundary B16 of the motor region A10*a* (FIG. 6*b*), without the double feed having to be sacrificed for this purpose. A particular advantage of this embodiment also lies in the fact that, as a comparison with FIG. 6*a* will show, no additional hardware components are required for its implementation.

Operation of a corresponding kind is possible with the embodiment shown in FIG. 6*c*, in which the same parts are given the same reference numerals as in FIG. 6*a*. In contrast to FIG. 6*b*, in this case the track-segment cable 90*d* is sub-divided, by a disconnecting switch 101 which is connected by a line 101*a* to the control means 42, into a first track-segment cable section 90*d*1 which is connected via the switching means 98*b* to the voltage source 93, and a second track-segment cable section 90*d*2 which is connected via the switching means 99*a* to the voltage source 94. When the disconnecting switch 101 is closed, then FIG. 6*c* is substantially the same as FIG. 6*a* in respect of arrangement and operation, i.e. a vehicle situated in the motor region A10 can only enter the motor region A11 when there is no longer another vehicle situated in the latter. The embodiment shown in FIG. 6*b* could also be implemented with the arrangement shown in FIG. 6*c*. When on the other hand the disconnecting switch 101 is in the open state, then on the one hand the track-segment cable section 90*d*1 can be connected to the voltage sources 93 and 92 by closing the switching means 98*b*, 98*a* and 97*b*, and on the other hand the track-segment cable section 90*d*2 can be connected to the voltage sources 94 and 95 by closing the switching means 99*a*, 99*b* and 100*a*. In the extreme case, i.e. with vehicles brought to the maximum closeness, this makes it possible for a vehicle 7*m* and 7*n* to be allowed to run on each of the two mutually independent track-segment cable sections 90*d*1 and 90*d*2. In this case too, there appears a motor region A10*b* which is lengthened in comparison with the motor region A10 in FIG. 6*a* and, similarly, a motor region A11*b* which is shortened in comparison with the motor region A11 in FIG. 6*a*. In other words, there has been a shift in the region boundary B15 (FIG. 6*a*), by the length of the track-segment cable section 90*d*1, to a region boundary B17 (FIG. 6*c*) whose position is defined by the disconnecting switch 101. As in the embodiments shown in FIGS. 5*b* and 6*b*, the change in the region boundaries B15, B17 takes place without the double feed being sacrificed. A comparable function can be achieved if the switching means 98*b*, 99*b* are done away with and the track-segment cable sections 90*d*1 and 90*d*2 are connected permanently to the track-segment cable 90*e*. This may be considered particularly when the track-segment cable 90*d* can be divided up by means of a plurality of disconnecting switches 101 (not shown) into track-segment cable sections 90*d*1 and 90*d*2 of various desired length ratios, thus enabling the boundary B17 to be shifted in this way in a desired way between the voltage sources 93 and 94. The switching means 98*b* and 99*b* are thus replaced by a disconnecting switch 101 which is situated in the vicinity of the voltage source 93 or 94.

A comparison of FIGS. 3*a*, 4*a*, 5*a* and 6*b* with the rest of the Figures will show that the invention can be implemented by using the voltage sources which had already been provided hitherto and, in all its embodiments, without any loss of thrust for the vehicles, or in other words of driving power able to be fed to them. The switching means too can be used without any major changes. Hence adjustment to different frequencies of service or intervals between vehicles can be carried out at relatively low cost in hardware and/or software.

Finally, the shift which has been described of the region boundaries B may, if required, also be provided at a plurality of selected motor regions A which are present along the track, in which case the plurality may even comprise all the motor regions which are present along the track. In the ideal case, variable region boundaries may therefore be provided along the entire track and the frequencies of service may therefore be selected to be the same or different to suit requirements.

The invention is not limited to the embodiments which have been described, which can be modified in many ways. In particular, to avoid losses of thrust if changeover points between the individual winding sections are overrun, all the provisions which have become known to date for this purpose, which are known as leapfrog, alternating step, three-step or four-step processes (e.g. the magazine elektrotechnische Zeitschrift etz, Vol. 108, 1987, No. 9, pp. 378 to 381, DE 199 22 411 A1, DE 102 27 253 A1), may be made. Similar provisions could be made for the changeover of the track-segment cables. The switching means and control means which have been described, and the stipulations made for the various motor regions or motor region sections, could also be different from those described. It is also possible, at least in the case of the arrangement shown in FIG. 3b, for a plurality of disconnecting switches 57 and voltage sources 60 to be provided to sub-divide the motor region A2 into more than two mutually independent sub-regions. Apart from this, it is clear that as many motor regions as are desired may be arranged to be variable in the manner described along the track. Also, the further voltage source 88 in FIG. 5b may be arranged in the sub-station in which the voltage source 79b is also housed, and the third track-segment cable section 86 may be laid parallel to the track-segment cable section 77c2. If, as in FIG. 2, the vehicles 7 are driven by two or more linear motors, each linear motor involved may also be arranged as shown in FIG. 3b, 4b, 4c, 5b, 6b or 6c, for which reason only one linear motor is shown in each of the drawings. A plurality of disconnecting devices may be provided in one or more track-segment cable sections, thus enabling, in the extreme case, two vehicles to be run one behind the other in two successive long-stator winding sections 5.1 to 5.9 by shifting the region boundary B in synchronization behind the first vehicle, on its leaving the winding section, by the said winding section. Finally, it is understood that the various features may also be applied in combinations other than those described and shown.

It will be understood, that each of the elements described above or two or more together, may also find a useful application in other types of construction differing from the types described above.

While the invention has been illustrated and described as embodied in a magnetic leviation (maglev) arrangement, it is not intended to be limited to the details shown, since various modifications and structural changes may be made without departing in any way from the spirit of the present invention.

Without further analysis, the forgoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

The invention claimed is:

1. Arrangement having at least one long-stator linear motor for operating magnetically levitated vehicles (7), comprising: at least one a.c. winding (5, 26) which is laid out longitudinally of a track and is sub-divided into winding sections (5.1 to 5.9, 26.1 to 26.9), an exciter arrangement (6) which is mounted on said vehicle (7), track-segment cables (51; 65; 77; 90) arranged longitudinally of said track, voltage sources (53; 62 to 64; 78, 79; 91 to 95) arranged at a distance longitudinally of said track, switching means (52, 54, 55; 66, 67, 71; 80 to 83; 96 to 100), control means (42) connected to the latter for connecting said winding sections (5.1 to 5.9, 26.1 to 26.9) in succession to assigned ones of said track-segment cables (51; 65; 77; 90) and voltage sources (53; 62 to 64; 78, 79; 91 to 95) in line with a movement of said vehicle (7), and motor regions (A) which follow one another in the direction of the track, which are formed by assigned ones of said winding sections (5.1 to 5.9, 26.1 to 26.9), track-segment cables (51; 65; 77; 91) and voltage sources (53; 62 to 64; 78, 79; 91 to 95), and which are marked off from one another by region boundaries (B) such that in each of said motor regions (A) only one vehicle (7) can be operated, wherein, to make different frequencies of service possible for said vehicles (7) or in other words to make different intervals possible between said vehicles (7), at least one of said motor regions (A) is provided with at least one region boundary (B) which is arranged to be variable.

2. Arrangement according to claim 1, wherein said region boundary (B15) can be varied by means of said switching means (96a to 100a).

3. Arrangement according to claim 1 or 2, wherein said region boundary can be varied by means of at least one disconnecting switch (57; 68; 73; 85; 101) which is fitted in a track-segment cable (51c; 65b, 65c; 77c; 90d).

4. Arrangement according to claim 1 or 2, wherein at least one motor region (A2) is present which is defined by a first region boundary (B3) and which has a track-segment cable (51c) and a voltage source (53a) assigned thereto, said track-segment cable (51c) being able to be sub-divided by at least one disconnecting switch (57), which defines a second region boundary (B4), into a first track-segment cable section (51c1) which is assigned to said voltage source (53a) and a second track-segment cable section (59c2) which can be connected to a further voltage source (60) which is independent of said voltage source (53a).

5. Arrangement according to claim 4, wherein said two voltage sources (53a, 60) are housed in a common sub-station and a track-segment cable section (59c2) remote from said sub-station is connected to said further voltage source (60) by means of a third track-segment cable section (58).

6. Arrangement according to claim 1 or 2, wherein at least one first motor region, and one second motor region (A4, A5) which follows the latter in the direction of travel, are provided which each have a voltage source (62, 63) and two track-segment cables (65a, 65b; 65c, 65d) which can be connected to the latter as desired, two track-segment cables (65b, 65c) which belong to said two motor regions (A4, A5) and which follow one another in the direction of travel being connected together by a disconnecting switch (68; 73) and said control means (42) being so arranged that different region boundaries can be produced for said motor regions (A4, A5) by closing or opening said disconnecting switch (68, 73) and actuating said switching means (66a, 66b; 70a, 70b; 74, 75).

7. Arrangement according to claim 6, wherein said track-segment cables (65b, 65c) connected by said disconnecting switch (73) are of different lengths.

8. Arrangement according to claim 1 or 2, wherein at least two motor regions (A7, A8) which follow one another in a direction of travel and define a first region boundary (B11) are present, which motor regions each have a track-segment cable (77b; 77c) and voltage sources (78a, 78b; 78b, 79b) assigned to the latter, at least said track-segment cable (77c) belonging to one motor region (A8) being divided into two track-segment cable sections (77c1, 77c2) by a disconnecting switch (85) which defines a second region boundary (B14) and is connected to said control means (42), and said control means (42) being so arranged that, when said disconnecting switch (85) is closed, said two track-segment cable sections (77c1, 77c2) are connected to said two assigned voltage sources (78b, 79b) by means of said switching means (80, 81, 84, 87), and when on the other hand said disconnecting switch (85) is open, one track-segment cable section (77c1) can be connected to a first one (78b) of said assigned voltage sources, and a voltage source (78a) belonging to said other motor region (A7), and said other track-segment cable section (77c2) can be connected to a second one (79b) of said assigned voltage sources and to a further voltage source (88) which serves to change said region boundary (B11).

9. Arrangement according to claim 8, wherein said first voltage source (78b) and said further voltage source (88) are housed in a common sub-station and a track-segment cable section (77c2) remote from said sub-station can be connected to said further voltage source (88) by means of a third track-segment cable section (86).

10. Arrangement according to claim 1 or 2, wherein said two motor regions (A10, A11) which follow one another in said direction of travel each have two track-segment cables (90b, 90c; 90d, 90e) which are arranged one behind the other and three assigned voltage sources (91 to 93; 93 to 95) which can be connected in pairs to said track-segment cables (90b, 90c; 90d, 90e), and wherein said control means (42) and said switching means (96 to 99) are so arranged that, to change a first region boundary (B15) defined by said two motor regions (A10, A11), one (90d) of said two track-segment cables belonging to one of said motor regions (A11) can be disconnected from an assigned voltage source (94) belonging to this motor region (A11) and at said same time can be connected to an adjoining track-segment cable section (90c) belonging to an other one (A10) of said two motor regions.

11. Arrangement according to claim 1 or 2, wherein at least two motor regions (A10, A11) which follow one another in said direction of travel each have two track-segment cables (90b, 90c; 90d, 90e) which are situated one behind the other and three voltage sources (91 to 93; 93 to 95) which can be connected in pairs to said track-segment cables (90b, 90c; 90d, 90e), at least one motor region (A11) having a track-segment cable (90d) which is divided, by a disconnecting switch (101) which is fitted into it and which is connected to said control means (42), into two track-segment cable sections (90d1; 90d2) which can each be connected to an assigned one of said voltage sources (93, 94), and said control means (42) and said switching means (90b to 100a) being so arranged that, when said disconnecting switch (101) is open, each track-segment cable section (90d1, 90d2) can be connected to assigned ones of said voltage sources (93, 94) and, via a respective track-segment cable (90c, 90e) belonging to one of said two motor regions (A10, A11) to, in addition, a voltage source (92, 95) which is situated upstream or downstream thereof.

* * * * *